United States Patent [19]
Sekiguchi

[11] Patent Number: 5,880,780
[45] Date of Patent: Mar. 9, 1999

[54] SOLID STATE IMAGING DEVICE

[75] Inventor: Katsuo Sekiguchi, Kanagawa, Japan

[73] Assignee: Sony Corporation, Tokyo, Japan

[21] Appl. No.: 996,393

[22] Filed: Dec. 23, 1992

[30] Foreign Application Priority Data

Dec. 26, 1991 [JP] Japan ................................. 3-345089

[51] Int. Cl.⁶ .................................................. H04N 5/217
[52] U.S. Cl. ........................................... 348/241; 348/249
[58] Field of Search .......................... 358/213.11, 213.23,
358/213.19, 213.31, 212; 257/242; 345/58,
92; 348/241, 249

[56] References Cited

U.S. PATENT DOCUMENTS 4,845,482  7/1989  Howard et al. ............................ 345/58

OTHER PUBLICATIONS

Mahese–Cross Modulation and Disuniformity Reduction in the Addressing of Passive Matrix Displays—Eurodisplay Proceedings; Sep. 18–20, 1984.

*Primary Examiner*—Andrew Faile
*Assistant Examiner*—Andrew B. Christensen
*Attorney, Agent, or Firm*—Hill & Simpson

[57] ABSTRACT

A solid state imaging device includes an array of photosensitive elements for storing signal charges, a plurality of vertical shift registers for storing the signal charges transferred from the photosensitive elements, charge storage sections for storing one field of signal charges transferred from the respective vertical shift registers, a horizontal shift register for storing one line of signal charges transferred thereto successively at time intervals from the charge storage sections, a timing generator for producing clock pulses for driving the vertical shift registers to transfer the signal charges from the vertical shift registers to the charge storage sections and to sweep residual charges from the vertical shift registers, and a driver for amplifying the clock pulses fed thereto from the timing generator. The driver has a variable amplification factor. The amplification factor of the driver is controlled to provide a smaller amplitude for the clock pulses used to sweep the residual charges than for the clock pulses used to transfer the signal charges.

3 Claims, 4 Drawing Sheets

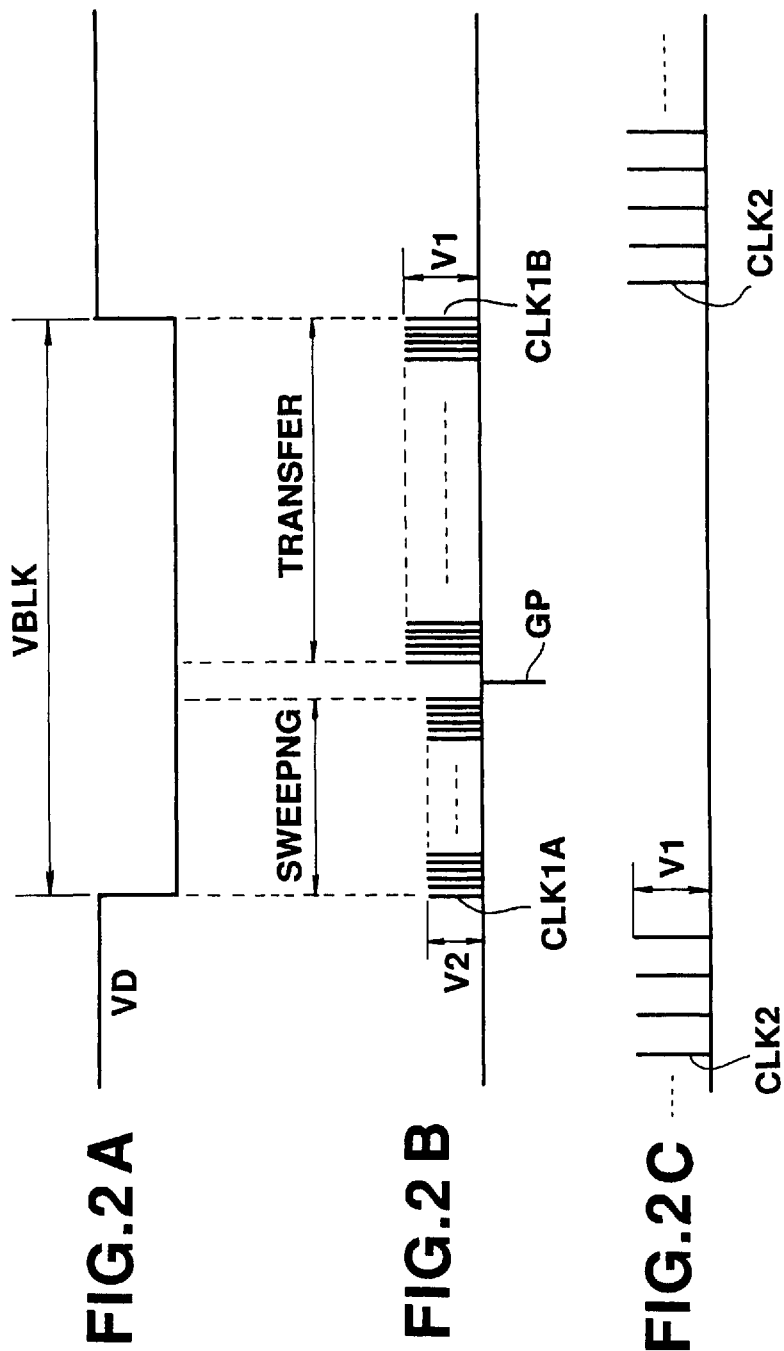

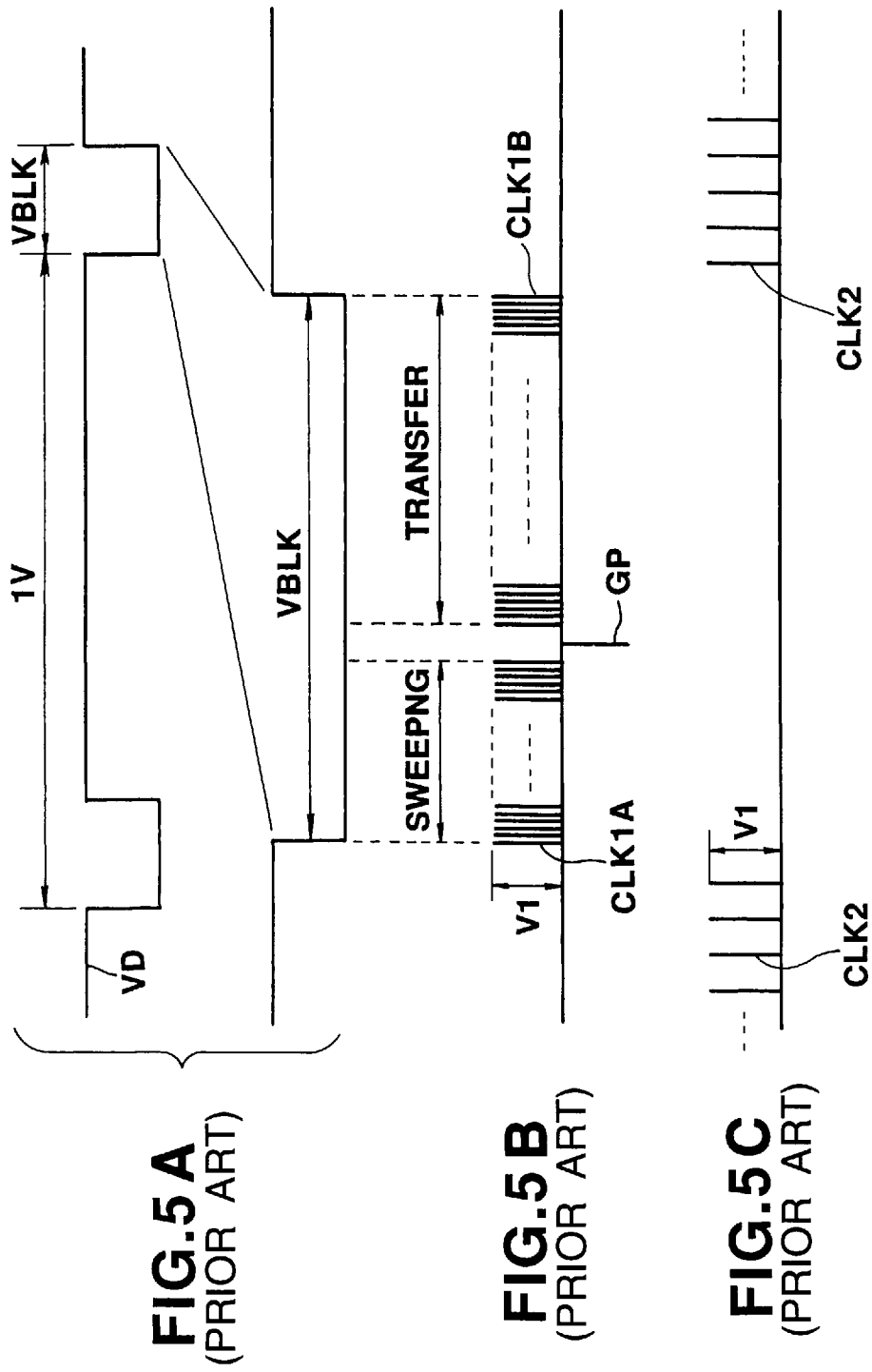

5,880,780

SOLID STATE IMAGING DEVICE

BACKGROUND OF THE INVENTION

This invention relates to a solid state imaging device of the type having an array of photosensitive elements for storing signal charges.

Solid state imaging devices employs an M×N array of photosensitive elements for storing signal charges induced when exposed to light. The signal charges are transferred from the photosensitive elements to vertical shift registers provided for the photosensitive elements arranged in the respective vertical lines of the array. Clock pulses are applied in one direction to transfer the signal charges from the vertical shift registers for conversion into a video signal. Similar clock pulses are applied in the opposite direction to sweep the residual charges from the vertical shift registers before the next cycle of the signal charge transferring operation. In order to complete the residual charge sweeping operation as well as the signal charge transferring operation in a shorter time, it is required to set the clock pulses at a higher frequency. However, this will cause much power consumption and much heat generation having an adverse effect on the characteristics of the stolid state imaging device.

SUMMARY OF THE INVENTION

It is a main object of the invention to provide an improved solid state imaging device which consumes less power and exhibits good characteristics held unchanged.

There is provided, in accordance with the invention, a solid state imaging device comprising an array of photosensitive elements for storing signal charges, a plurality of vertical shift registers for storing the signal charges transferred from the photosensitive elements, charge storage sections for storing one field of signal charges transferred from the respective vertical shift registers, a horizontal shift register for storing one line of signal charges transferred thereto successively at time intervals from the charge storage sections, a timing generator for producing clock pulses for driving the vertical shift registers to transfer the signal charges from the vertical shift registers to the charge storage sections and to sweep residual charges from the vertical shift registers, and a driver for amplifying the clock pulses fed thereto from the timing generator. The driver has a variable amplification factor. A control means is provided for controlling the amplification factor of the driver provide a smaller amplitude for the clock pulses used to sweep the residual charges than for the clock pulses used to transfer the signal charges.

BRIEF DESCRIPTION OF THE DRAWINGS

The invention will be described in greater detail by reference to the following description taken in connection with the accompanying drawings, in which:

FIGS. 2A, 2B and 2C are voltage waveform timing diagrams showing the various pulses for driving the solid state image sensor used in the imaging device of FIG. 1;

FIGS. 5A, 5B and 5C are voltage waveform timing diagrams showing the various pulses for driving the solid state image sensor used in the imaging device of FIG. 4.

DETAILED DESCRIPTION OF THE INVENTION

Figure 4:
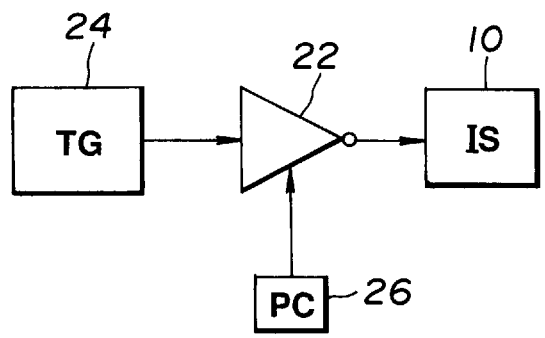
FIG. 4 is a schematic block diagram showing a conventional solid stage imaging device.
Figure 3:
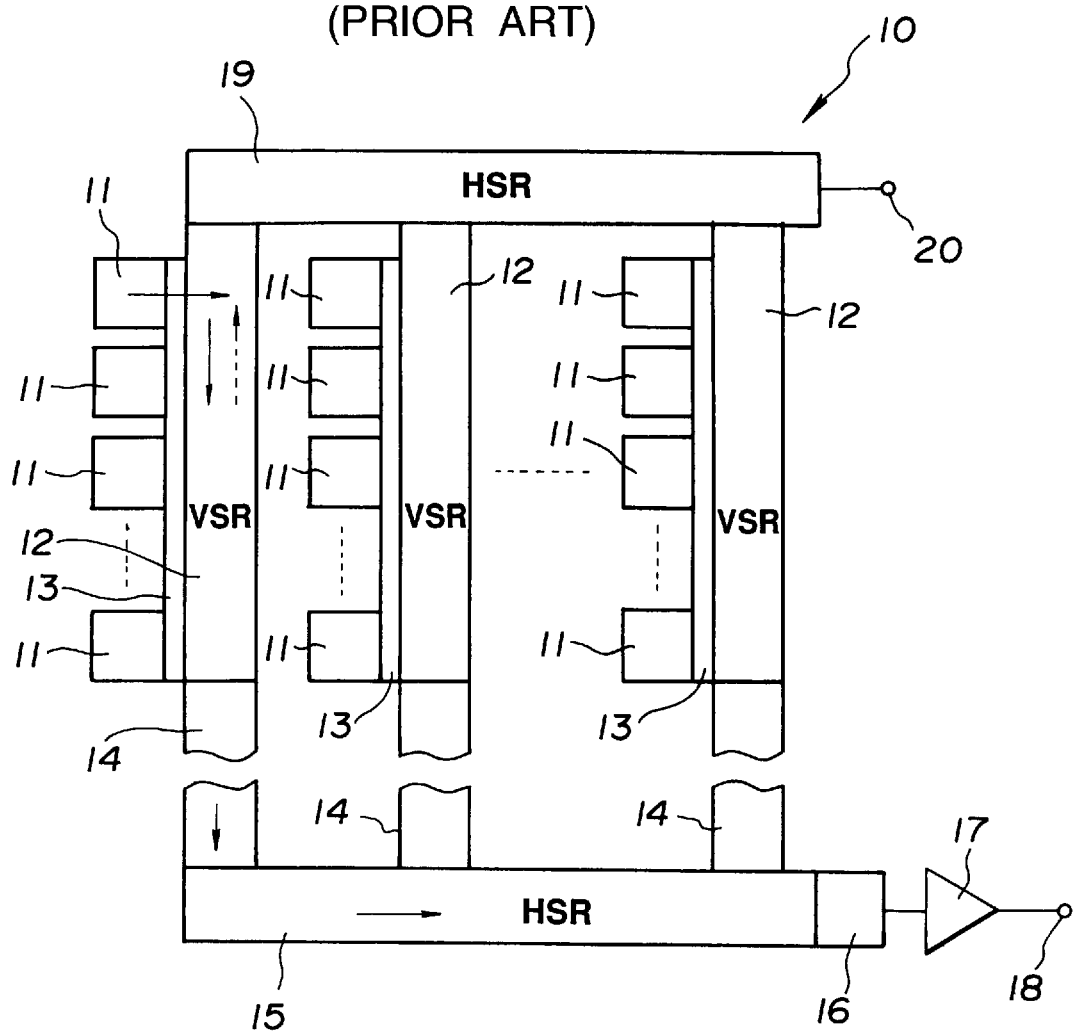
FIG. 3 is a schematic diagram showing the detailed structure of a solid state image sensor which may be used in the imaging device of FIG. 1.

Prior to the description of the preferred embodiment of the invention, the prior art solid state imaging device of FIGS. 3 and 4 are briefly described in order to provide a basis for a better understanding of the difficulties attendant thereon.

Referring to FIG. 3, there is illustrated a frame interline transfer (FIT) type solid state image sensor 10. The solid state image sensor 10 includes an M×N array of photosensitive elements 11. The photosensitive elements 11 arranged in the vertical lines of the array are associated with respective vertical shift registers (VSR) 12 through respective reading gate regions 13. The vertical shift registers 12 are connected at the one end thereof through respective charge storage sections 14 to a horizontal shift register (HSR) 15. The charge storage sections 14 temporarily store one field of signal charges transferred thereto from the corresponding vertical shift registers 12. The horizontal shift register 15 receives one line of signal charges transferred thereto from the charge storage sections 14 at uniform intervals of time. The horizontal shift register 15 is connected at its one end with a voltage converter 16 which converts the signal charges transferred thereto into a video signal (voltage signal). This video signal is fed through an amplifier 17 to an output terminal 18. The other ends of the vertical shift registers 12 are connected to a horizontal shift register (HSR) 19. The residual charges, which remain in the vertical shift resistors 12 after the operation of transferring the signal charges from the vertical shift resistors 12 to the charge storage sections 14, are swept to the horizontal shift register 19. The swept charges are exhausted from the horizontal shift register 19 to an exhaust terminal 20.

Referring to FIG. 4, the solid state image sensor (IS) 10 is used in a conventional solid state imaging device. The solid state image sensor (IS) 10 is connected through a driver 22 to a timing generator (TG) 24. The timing generator 24 produces various driving pulse signals. The driver 22 receives the driving pulse signals fed from the timing generator 24 and amplifies them. The amplified driving pulse signals are fed to drive the solid state image sensor 10. The driver 22 has an input coupled to a power circuit (PC) 26. The power circuit 26 provides a reference voltage V1 to determine the amplification factor of the driver 22 and, thus, the amplitude of the driving pulse signals to the solid state image sensor 10.

The operation of the conventional solid state imaging device will be described in connection with FIGS. 5A, 5B and 5C which are voltage waveform diagrams showing the various driving pulses to the solid state image sensor 10. FIG. 5A shows vertical driving pulses (VD). In the solid state image sensor 10, the residual charge sweeping operation and the signal charge transferring operation are made during a vertical blanking period (VBLK). As shown in FIG. 5B, first vertical transfer clock pulses (CLK1A) are produced and applied at uniform intervals of time to sweep the residual charges from the vertical shift registers 12 to the horizontal shift register 19. The swept residual charges are exhausted from the horizontal shift register 19 to the exhaust terminal 20. A gate pulse (GP) is then applied to the reading gate regions 13 which thereby transfer the signal charges from the photosensitive elements to the respective vertical shift registers 12, as shown in FIG. 5B. Following this, second vertical transfer clock pulses (CLK1B) are produced at the same frequency as the first vertical transfer clock pulses (CLK1A) and in a direction opposite to the direction of the first vertical transfer clock pulses (CLK1A) to transfer the signal charges from the vertical shift resistor 12 to the charge storage sections 14, as shown in FIG. 5B. One line of signal charges are transferred from the charge storage sections 14 to the horizontal shift register 15 at uniform intervals of time specified by the lineshift clock pulses (CLK2), as shown in FIG. 5C. The transferred signal charges are converted into a video signal which is fed to the output terminal 18.

With the conventional solid state imaging device, the residual charge sweeping operation and the signal charge transferring operation should be made in a short time of the vertical blanking period (VBLK). For this reason, the frequency of the first and second vertical transfer clock pulses (CLK1A, CLK1B) used to drive the vertical shift registers 12 should be set at a very high frequency. The vertical shift registers 12 operate in response to the vertical transfer clock pulses (CLK1A, CLK1B) and consume powers P1 and P2. The powers P1 and P2, which are substantially the same and directly proportional to the frequency f and amplitude of the vertical transfer clock pulses (CLK1A, CLK1B), that is, the square of the voltage V1 applied to the driver 22, are represented as:

$$P1 = P2 = f \cdot C \cdot (V1)^2$$

where C is the load capacity of the solid state imaging device. As can be seen from the above equation, the conventional solid state imaging device consumes a great amount of power (P1, P2) and generates a great amount of heat in the vertical shift registers 12 to have an adverse effect on the characteristics of the solid state image sensor 10.

Figure 1:
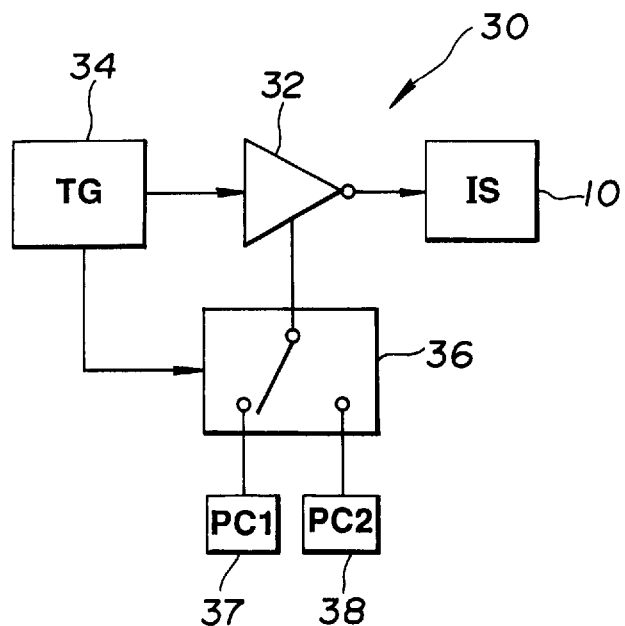
FIG. 1 is a schematic block diagram showing one embodiment of a solid state imaging device made in accordance with the invention.

Referring to FIG. 1, there is illustrated one embodiment of a solid state imaging device made in accordance with the invention. The solid state imaging device, generally designated by the numeral 30, employs a solid state image sensor 10 which is substantially the same as described in connection with the schematic diagram of FIG. 3. The solid state image sensor 10 has an input connected through a driver 32 to a timing generator (TG) 34. The timing generator 34 generates various driving pulse signals (CLK1A, CLK1B, CLK2, GP). The driver 32 amplifies the driving pulse signals fed thereto from the timing generator 34. The amplified driving pulse signals are applied to the solid state image sensor 10. The driver 32 has a control terminal for receipt of a control signal fed through a switching circuit 36 from a first power circuit (PC1) 37 or a second power circuit (PC2) 38. The first power circuit 37 produces a first reference voltage V1, and the second power circuit 38 produces a second reference voltage V2 less than the first reference voltage V1. For example, the second reference voltage V2 may be set at 80% of the first reference voltage V1. The switching circuit 36 normally occupies a first position connecting the first power circuit 37 to the driver 32. The switching circuit 36 responds to a command signal fed thereto from the timing generator 34 by changing to its second position connecting the second power circuit 38 to the driver 32. The driver 32 has a variable amplification factor determined by the voltage of the signal applied to its control terminal. The amplification factor decreases as the magnitude or voltage of the control signal applied to the control terminal deceases.

The operation of the solid state imaging device of the invention will be described in connection with the voltage waveform diagrams of FIGS. 2A, 2B and 2C. First of all, first vertical transfer clock pulses (CLK1A) are applied to the vertical shift registers 12, as shown in FIG. 2B, during a vertical blanking (VBLK) period, as shown in FIG. 2A. In this case, the timing generator 34 generates a command placing the switching circuit 36 in its second position connecting the second power circuit 38 to the control terminal of the driver 32. As a result, the driver 32 amplifies the vertical transfer clock pulses (CLK1A) at a second, smaller amplification factor and produces driving pulses having a second, smaller amplitude V2, as shown in FIG. 2B. These driving pulses are used to sweep the residual charges from the vertical shift registers 12 to the horizontal shift register 19 in the solid state image sensor 10. After the residual charge sweeping operation, the timing generator 34 produces a gate pulse GP which is applied through the driver 32 to the reading gate region 13 of the solid state image sensor 10 so as to transfer the signal charges from the photosensitive elements 11 to the vertical shift registers 12.

Following this, the second vertical transfer clock pulses (CLK1B) are applied to the vertical shift registers 12, as shown in FIG. 2B, during the vertical blanking (VBLK) period, as shown in FIG. 2A. In this case, the timing generator 34 interrupts the command signal so that the switching circuit 36 returns to its first position connecting the first power circuit 37 to the control terminal of the driver 32. As a result, the driver 32 amplifies the second vertical transfer clock pulses (CLK1B) at a first amplification factor greater than the second amplification factor and produces driving pulses having a first amplitude V1 greater than the second amplitude V2, as shown in FIG. 2B. These driving pulses are used to transfer the signal charges from the vertical shift registers 12 to the charge storage sections 14. The signal charges in the storage sections 14 are transferred to the horizontal shift register 15 and converted into a video signal which is fed to the output terminal 18.

The relationship between the power P1 consumed during the residual charge sweeping operation and the power P2 consumed during the signal charge transferring operation is represented as follows:

$$P1 = f \cdot C \cdot (V2)^2 = f \cdot C \cdot (0.8 \times V1)^2 = 0.64 \cdot P2$$

As can be seen from the above equation, the power P1 consumed during the residual charge sweeping operation is much smaller than the power P2 consumed during the signal charge transferring operation. It is, therefore, possible to reduce the heat generated in the vertical shift registers 12 to a great extent. This is effective to maintain the characteristics of the solid state image sensor 10 unchanged.

Although it may be considered that a reduction in the amplitude of the vertical transfer clock pulses (CLK1A) will cause a small amount of charges to be left in the vertical shift registers 12 during the residual charge sweeping operation, it is possible to completely sweep the residual charges by an appropriate choice of the amplitude of the vertical clock pulses (CLK1A).

While the invention has been described in conjunction with a specific embodiment thereof, it is evident that many alternatives, modifications and variations will be apparent to those skilled in the art. Accordingly, it is intended to embrace all alternatives, modifications and variations that fall within the scope of the appended claims.

What is claimed is:

1. A solid state imaging device comprising: an array of photosensitive elements for storing signal charges, a plurality of vertical shift registers for storing the signal charges transferred from the photosensitive elements, charge storage sections for storing one field of signal charges transferred from the respective vertical shift registers, a horizontal shift register for storing one line of signal charges transferred thereto successively at time intervals from the charge storage sections, a timing generator for producing clock pulses for driving the vertical shift registers to transfer the signal charges from the vertical shift registers to the charge storage sections and to sweep residual charges from the vertical shift registers a driver for amplifying the clock pulses fed thereto from the timing generator, the driver having a variable amplification factor, control means for controlling the amplification factor of the driver so as to provide a smaller amplitude for the clock pulses used to sweep the residual charges than for the clock pulses used to transfer the signal charges, wherein the driver has a smaller amplification factor when it receives a smaller reference voltage, and wherein the control means includes means for producing a first reference voltage and a second reference voltage which is less than the first reference voltage, switching means for selectively coupling one of the first and second reference voltages to the driver, and wherein the switching means includes means for coupling the first reference voltage to the driver when the signal charges are to be transferred from the vertical shift registers to the respective charge storage sections and for coupling the second reference voltage to the driver when the residual charges are to be swept from the vertical shift registers.

2. The solid state imaging device as claimed in claim 1, wherein the second reference voltage is substantially 80% of the first reference voltage.

3. The solid state imaging device as claimed in claim 1, wherein the switching means includes means responsive to a reading gate pulse fed thereto from the timing generator for changing the reference voltage applied to the driver from the first reference voltage to the second reference voltage.

* * * * *